US011736610B2

(12) United States Patent
Buckley et al.

(10) Patent No.: US 11,736,610 B2
(45) Date of Patent: Aug. 22, 2023

(54) AUDIO-BASED MACHINE LEARNING FRAMEWORKS UTILIZING SIMILARITY DETERMINATION MACHINE LEARNING MODELS

(71) Applicant: OPTUM, INC., Minnetonka, MN (US)

(72) Inventors: Gregory Buckley, Dublin (IE); Damian Kelly, Kildare (IE); Mariah Sonja Pereira Penha, Dublin (IE); Jack Sullivan, Dublin (IE); Bruno Ohana, Dublin (IE)

(73) Assignee: Optum, Inc., Minnetonka, MN (US)

( * ) Notice: Subject to any disclaimer, the term of this patent is extended or adjusted under 35 U.S.C. 154(b) by 57 days.

(21) Appl. No.: 17/449,223

(22) Filed: Sep. 28, 2021

(65) Prior Publication Data
US 2023/0094583 A1    Mar. 30, 2023

(51) Int. Cl.
*H04M 3/51* (2006.01)
*G06N 20/20* (2019.01)
*G10L 15/06* (2013.01)
*G10L 15/26* (2006.01)
*G06F 18/22* (2023.01)

(52) U.S. Cl.
CPC ......... *H04M 3/5183* (2013.01); *G06F 18/22* (2023.01); *G06N 20/20* (2019.01); *G10L 15/063* (2013.01); *G10L 15/26* (2013.01)

(58) Field of Classification Search
CPC ...... H04M 3/5183; G06F 18/22; G06N 20/20; G10L 15/063; G10L 15/26
USPC ............ 379/265.02, 265.01, 265.1, 265.11, 379/265.05, 265.13, 265.12
See application file for complete search history.

(56) References Cited

U.S. PATENT DOCUMENTS

| | | |
|---|---|---|
| 8,781,880 B2 | 7/2014 | Kocsor et al. |
| 8,914,285 B2 | 12/2014 | Wasserblat et al. |
| 9,894,205 B1 | 2/2018 | Miller et al. |
| 9,947,342 B2 | 4/2018 | Feast et al. |
| 10,051,122 B2 | 8/2018 | Raanani et al. |

(Continued)

OTHER PUBLICATIONS

Kanchinadam, Teja et al. "Graph Neural Networks to Predict Customer Satisfaction Following Interactions With a Corporate Call Center," arXiv Preprint arXiv:2102.00420v1 [cs.LG] Jan. 31, 2021, (12 pages).

*Primary Examiner* — Thjuan K Addy
(74) *Attorney, Agent, or Firm* — Alston & Bird LLP

(57) ABSTRACT

There is a need for faster and more accurate predictive data analysis steps/operations. This need can be addressed by, for example, techniques for efficient predictive data analysis steps/operations. In one example, a computer-implemented method for generating a predictive output with respect to a primary audio data embedding data object associated with a primary audio data object, is provided. The method includes generating, using one or more computer processors, by utilizing a similarity determination machine learning model and based at least in part on the primary audio data embedding data object, the predictive output for the primary audio data embedding data object; generating, by the one or more computer processors, a forwarding recommendation prediction based at least in part on the predictive output; and performing, by the one or more computer processors, one or more prediction-based actions based at least in part on the forwarding recommendation prediction.

20 Claims, 11 Drawing Sheets

(56) References Cited

U.S. PATENT DOCUMENTS

| | | |
|---|---|---|
| 10,791,222 B2 | 9/2020 | Jiron et al. |
| 2015/0201077 A1 | 7/2015 | Konig et al. |
| 2017/0236131 A1 | 8/2017 | Nathenson et al. |
| 2020/0327444 A1 | 10/2020 | Negi et al. |
| 2020/0349614 A1 | 11/2020 | Batcha et al. |
| 2022/0374637 A1* | 11/2022 | Liu .................. G06V 20/46 |

* cited by examiner

AUDIO-BASED MACHINE LEARNING FRAMEWORKS UTILIZING SIMILARITY DETERMINATION MACHINE LEARNING MODELS

BACKGROUND

Various embodiments of the present invention address technical challenges related to performing predictive data analysis steps/operations that are configured to determine a predictive output with respect to a primary audio data embedding data object associated with a primary audio data object and disclose various innovative techniques for improving speed, efficiency and/or reliability of predictive data analysis systems.

BRIEF SUMMARY

In general, embodiments of the present invention provide methods, apparatuses, systems, computing devices, computing entities, and/or the like for performing predictive data analysis steps/operations by utilizing at least one of audio processing machine learning models and similarity determination machine learning models.

In accordance with one aspect, a computer-implemented method for generating a predictive output with respect to a primary audio data embedding data object associated with a primary audio data object is provided. The computer-implemented method comprising: generating, by utilizing a similarity determination machine learning model and based at least in part on the primary audio data embedding data object, the predictive output for the primary audio data embedding data object, wherein: the primary audio data object is associated with an event sequence, an audio processing machine learning model is configured to process the primary audio data object to generate a primary audio-based feature set and a primary transcription output data object for the primary audio data object, the similarity determination machine learning model comprises an audio embedding sub-model configured to process the primary audio-based feature set and the primary transcription output data object to generate a primary audio data embedding data object for the primary audio data object, the similarity determination machine learning model is configured to process the primary audio data embedding data object and a plurality of secondary audio data embedding data objects to identify a similar subset from the plurality of secondary audio data embedding data objects that each satisfy an above-threshold predictive similarity measure in relation to the primary audio data embedding data object, and the predictive output is determined based at least in part on the similar subset of the plurality of secondary audio data embeddings data objects; generating a forwarding recommendation prediction based at least in part on the predictive output; and performing one or more prediction-based actions based at least in part on the forwarding recommendation prediction.

In accordance with another aspect, an apparatus for determining a predictive output with respect to a primary audio data embedding data object associated with a primary audio data object is provided, the apparatus comprising at least one processor and at least one memory including program code, the at least one memory and the program code configured to, with the processor, cause the apparatus to at least: generate, by utilizing a similarity determination machine learning model and based at least in part on the primary audio data embedding data object, the predictive output for the primary audio data embedding data object, wherein: the primary audio data object is associated with an event sequence, an audio processing machine learning model is configured to process the primary audio data object to generate a primary audio-based feature set and a primary transcription output data object for the primary audio data object, the similarity determination machine learning model comprises an audio embedding sub-model configured to process the primary audio-based feature set and the primary transcription output data object to generate a primary audio data embedding data object for the primary audio data object, the similarity determination machine learning model is configured to process the primary audio data embedding data object and a plurality of secondary audio data embedding data objects to identify a similar subset from the plurality of secondary audio data embedding data objects that each satisfy an above-threshold predictive similarity measure in relation to the primary audio data embedding data object, and the predictive output is determined based at least in part on the similar subset of the plurality of secondary audio data embeddings data objects; generate a forwarding recommendation prediction based at least in part on the predictive output; and perform one or more prediction-based actions based at least in part on the forwarding recommendation prediction.

In accordance with yet another aspect, a computer program product for determining a predictive output with respect to a primary audio data embedding data object associated with a primary audio data object, the computer program product comprising at least one non-transitory computer-readable storage medium having computer-readable program code portions stored therein, the computer-readable program code portions configured to: generate, by utilizing a similarity determination machine learning model and based at least in part on the primary audio data embedding data object, the predictive output for the primary audio data embedding data object, wherein: the primary audio data object is associated with an event sequence, an audio processing machine learning model is configured to process the primary audio data object to generate a primary audio-based feature set and a primary transcription output data object for the primary audio data object, the similarity determination machine learning model comprises an audio embedding sub-model configured to process the primary audio-based feature set and the primary transcription output data object to generate a primary audio data embedding data object for the primary audio data object, the similarity determination machine learning model is configured to process the primary audio data embedding data object and a plurality of secondary audio data embedding data objects to identify a similar subset from the plurality of secondary audio data embedding data objects that each satisfy an above-threshold predictive similarity measure in relation to the primary audio data embedding data object, and the predictive output is determined based at least in part on the similar subset of the plurality of secondary audio data embeddings data objects; generate a forwarding recommendation prediction based at least in part on the predictive output; and perform one or more prediction-based actions based at least in part on the forwarding recommendation prediction.

BRIEF DESCRIPTION OF THE DRAWINGS

Figure 1:
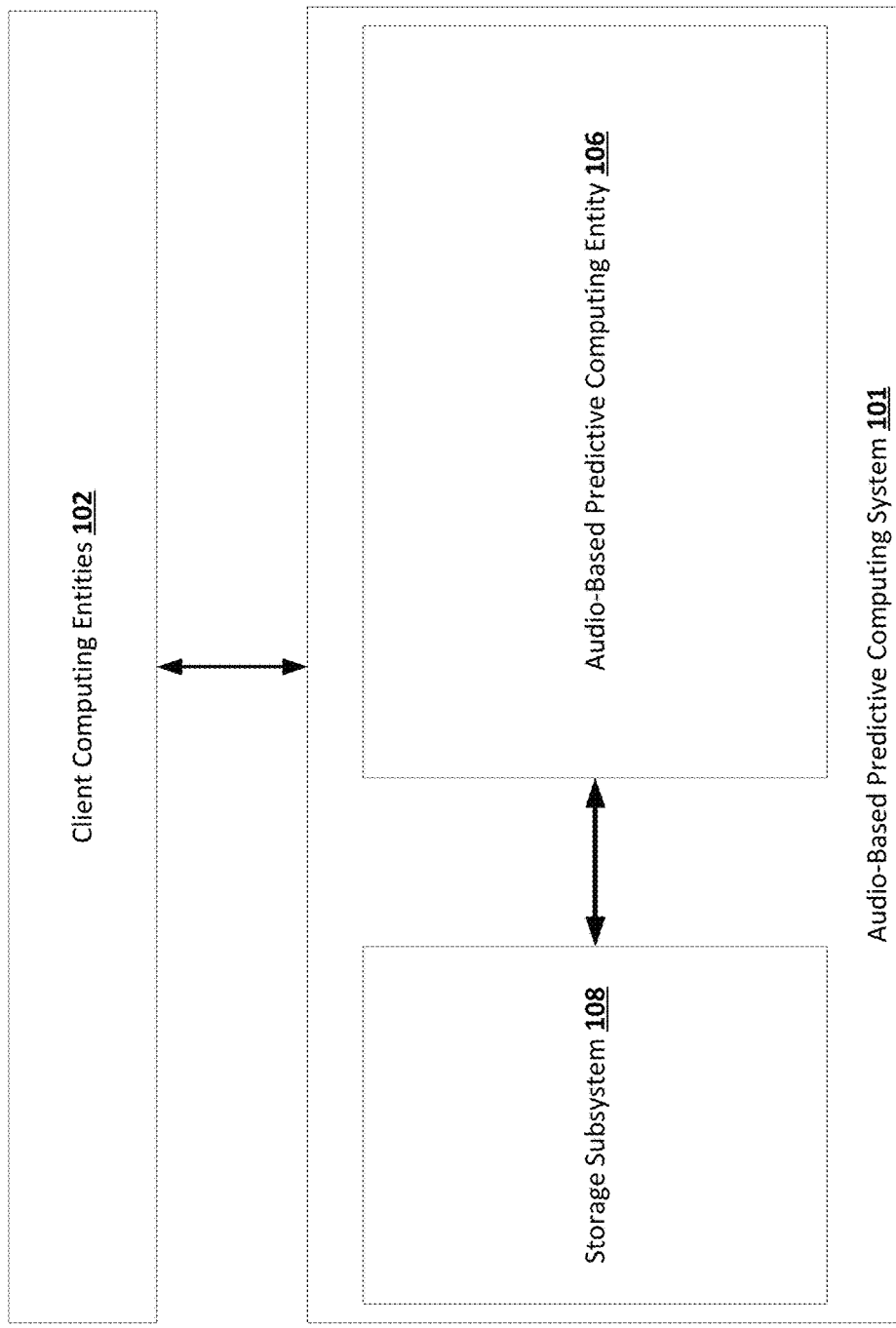
Figure 2:
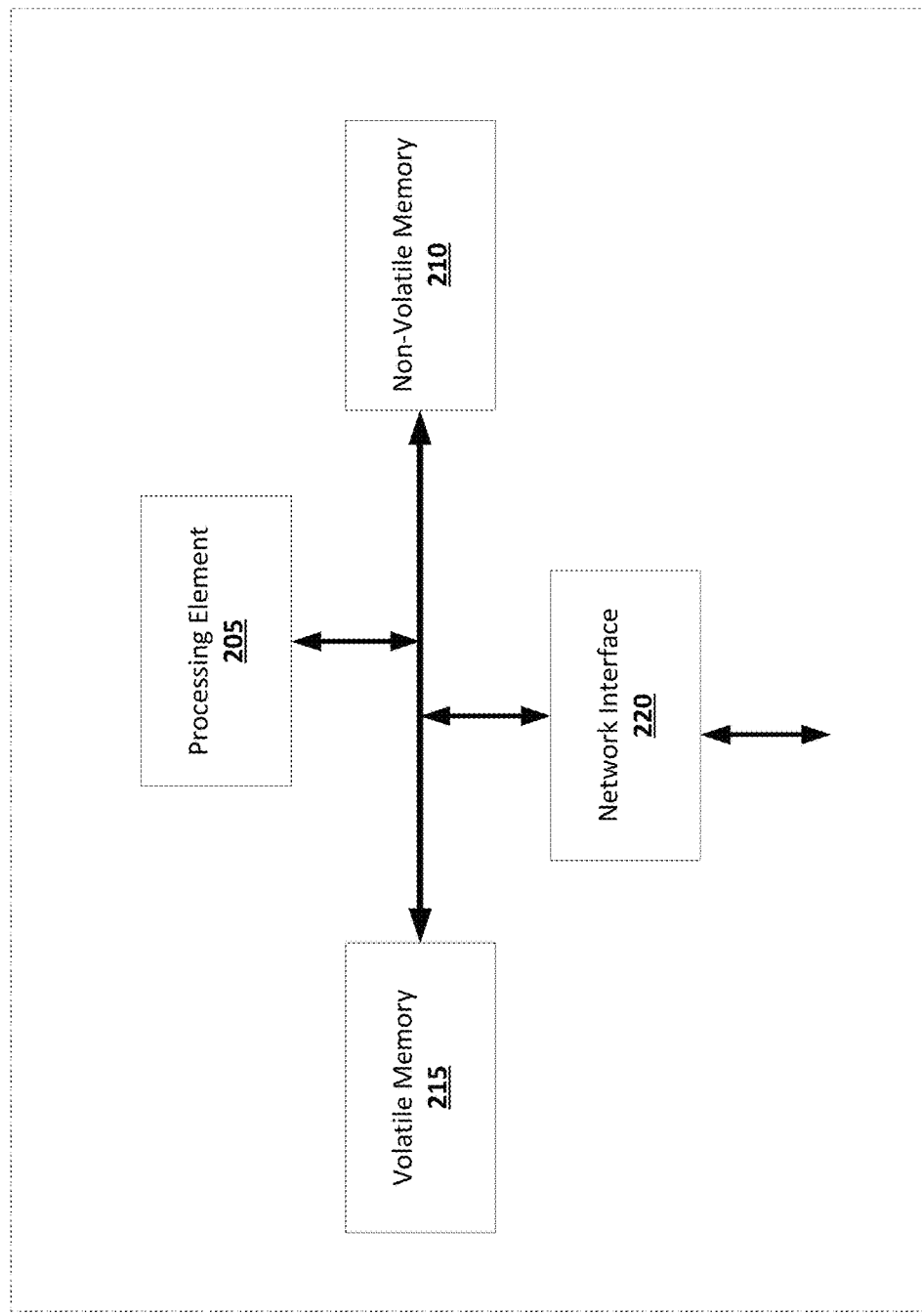
Figure 3:
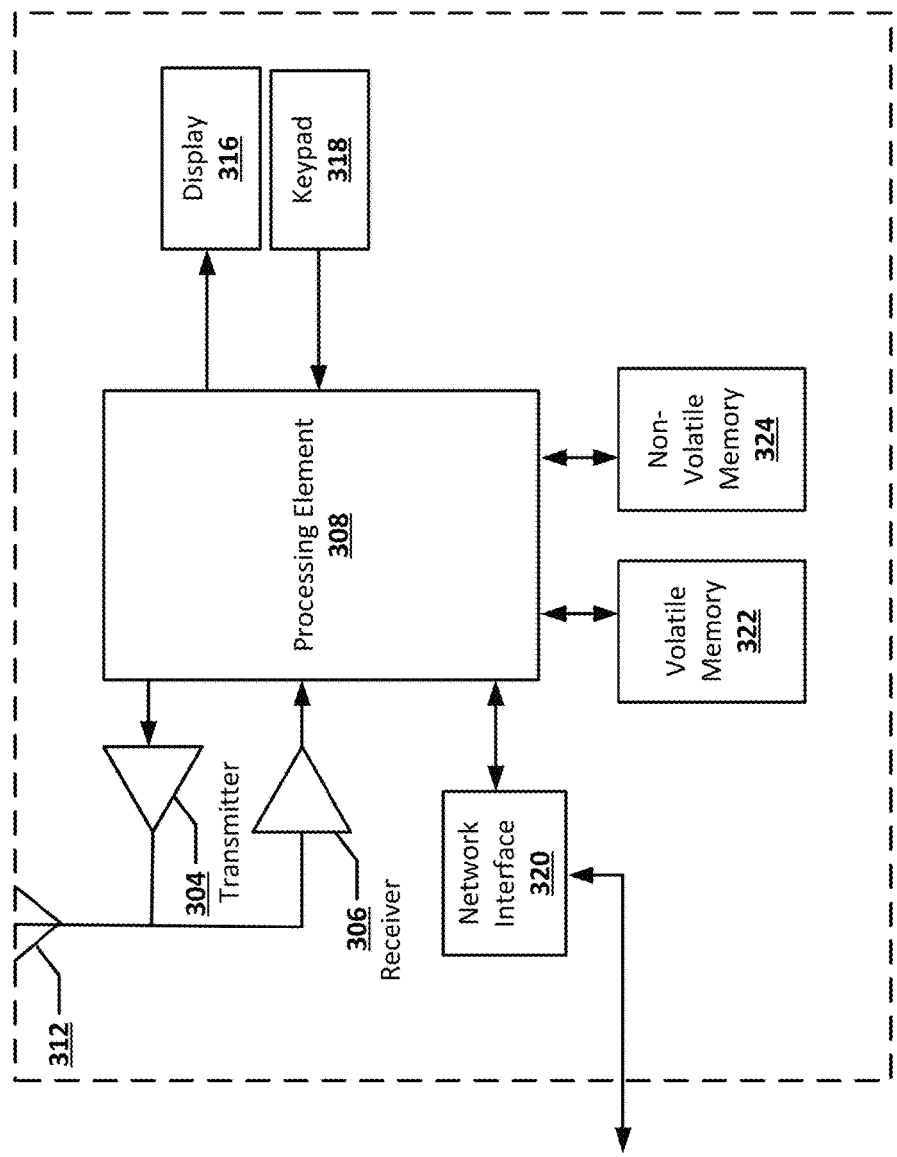
Figure 4:
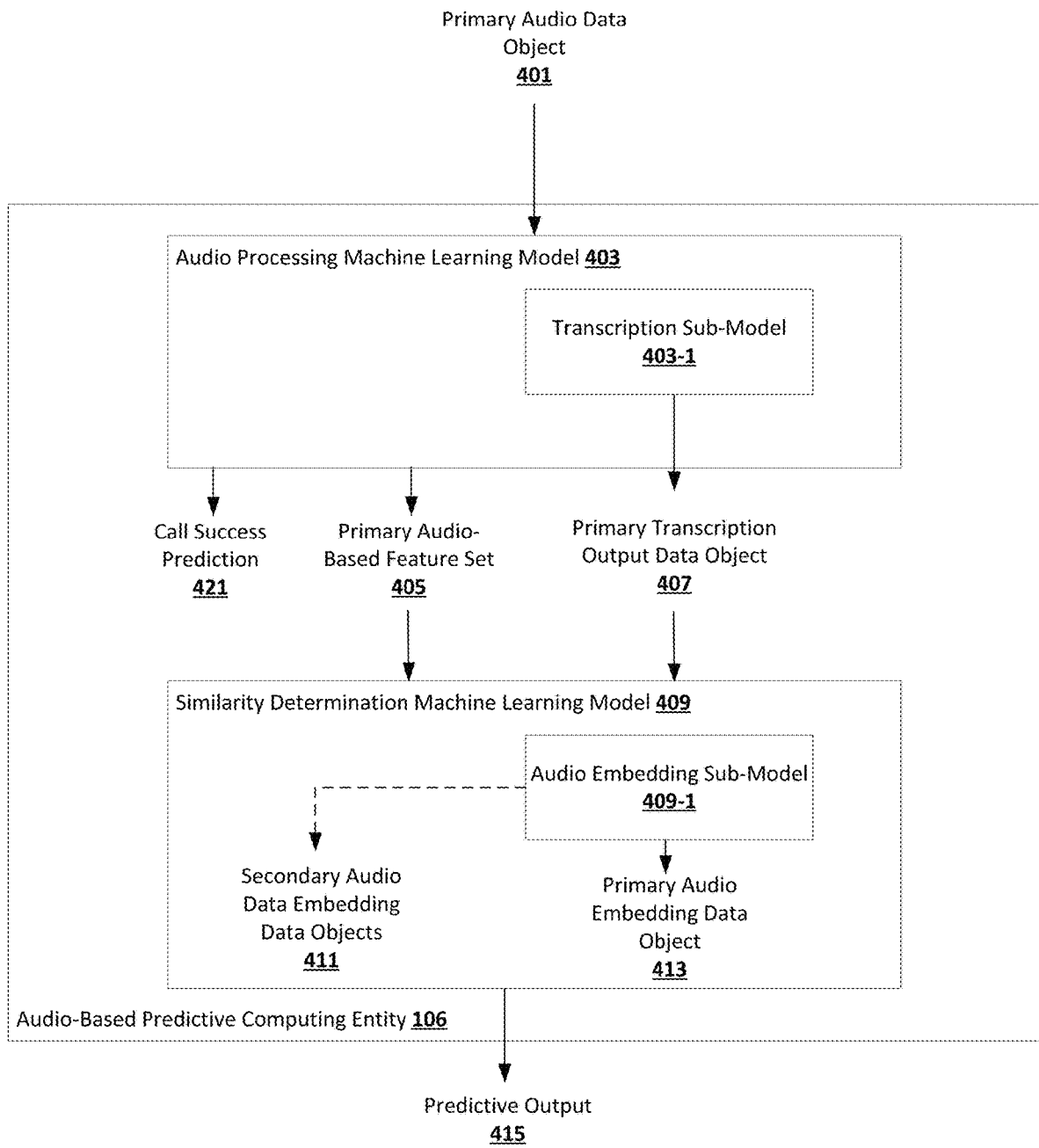
Figure 5:
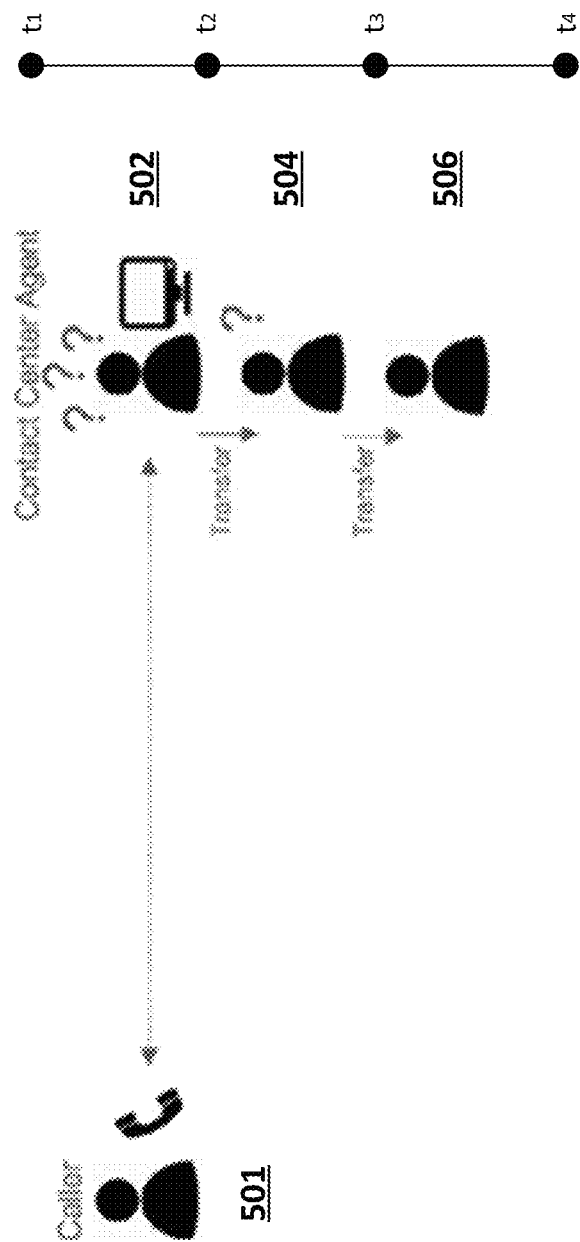
Figure 6:
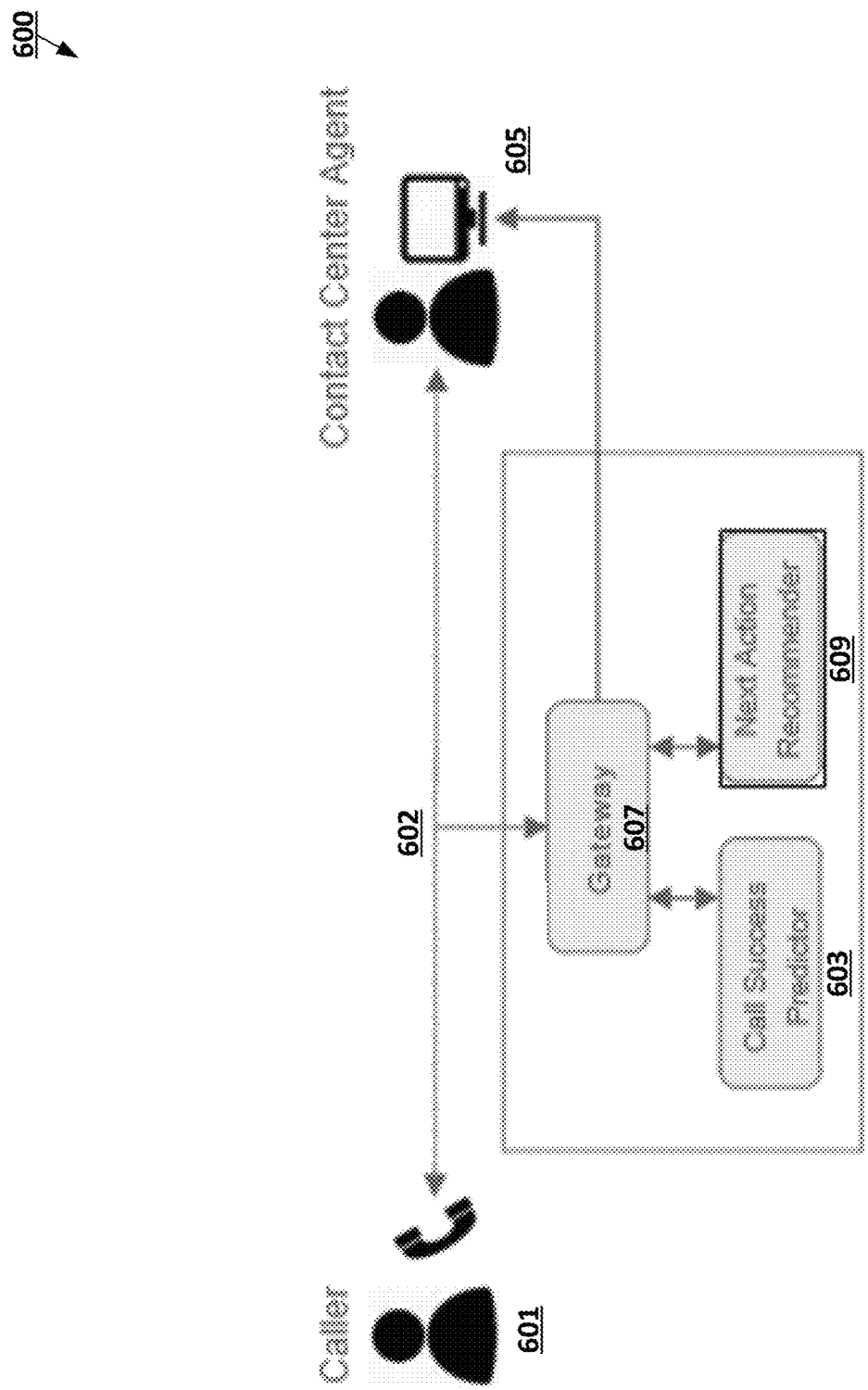
Figure 7:
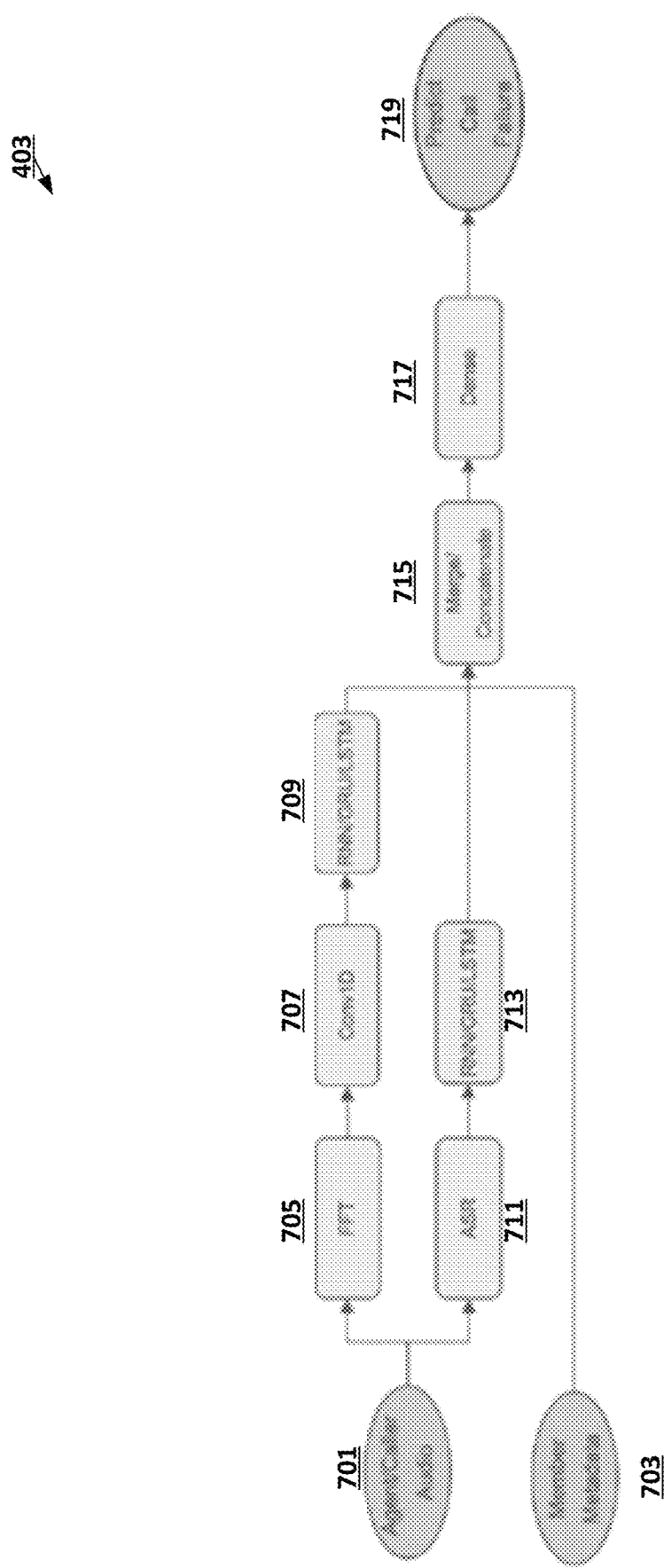
Figure 8:
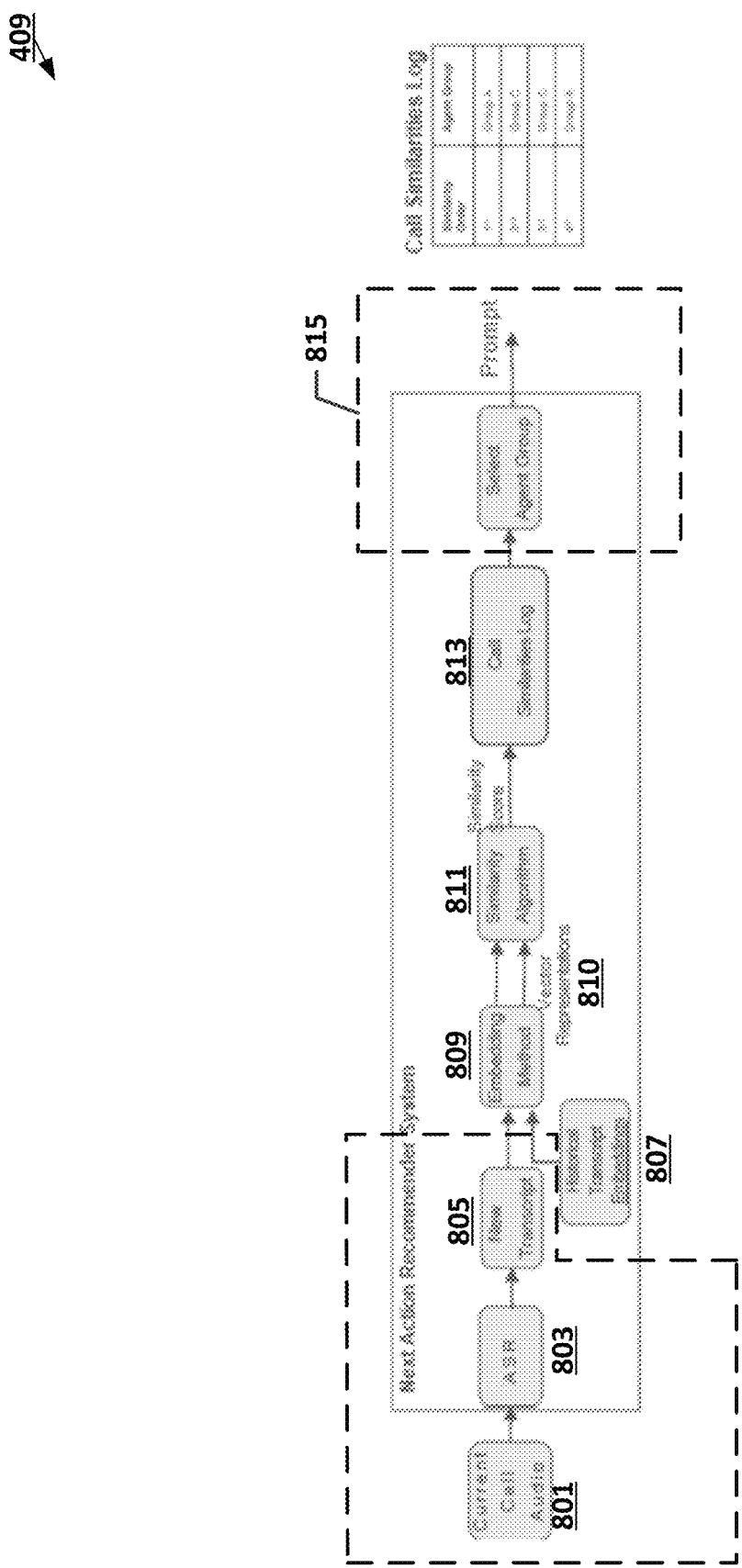
Figure 9:
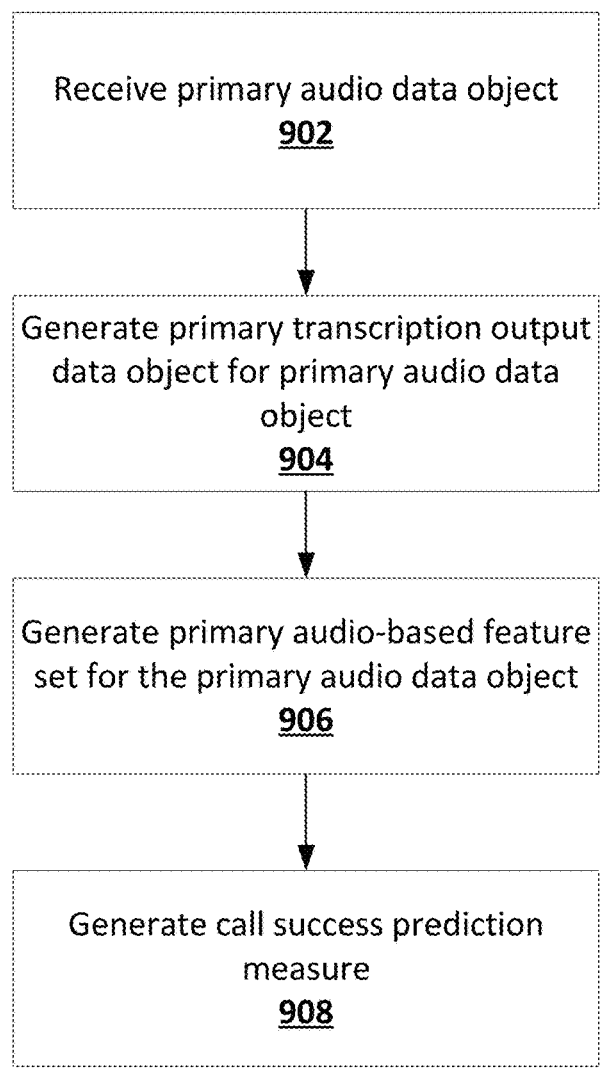
Figure 10:
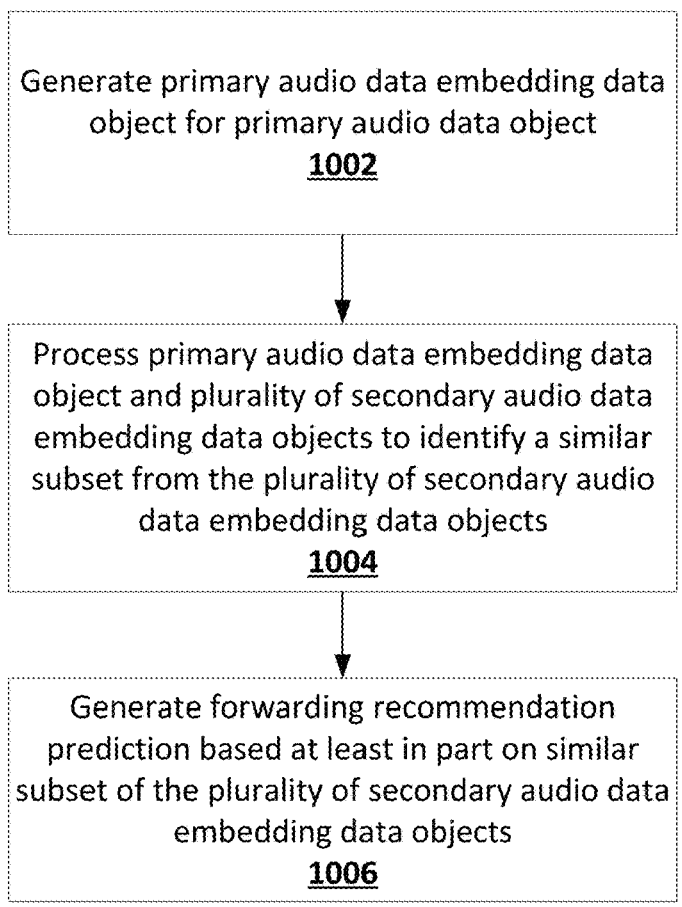
Figure 11:

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example audio-based predictive computing entity in accordance with some embodiments discussed herein;

FIG. 3 provides an example external computing entity in accordance with some embodiments discussed herein;

FIG. 4 provides an operational example of software architecture of an audio-based predictive computing entity in accordance with some embodiments discussed herein;

FIG. 5 provides an operational example of an event sequence in accordance with some embodiments discussed herein;

FIG. 6 provides an operational exemplary configuration of an exemplary audio processing machine learning model and a similarity determination machine learning model within the architecture of an exemplary audio-based predictive computing entity in accordance with some embodiments discussed herein;

FIG. 7 provides an operational example of an audio processing machine learning model in accordance with some embodiments discussed herein;

FIG. 8 provides an operational example of a similarity determination machine learning model in accordance with some embodiments discussed herein;

FIG. 9 provides a flowchart of an example process for generating a call success prediction in accordance with some embodiments discussed herein;

FIG. 10 provides a flowchart of an example process for generating a forwarding recommendation prediction in accordance with some embodiments discussed herein; and FIG. 11 provides an operational example of a prediction output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention introduce techniques for call forwarding management that result in processing calls using a fewer number of call forwarding operations and/or using a fewer number of call center agents. By utilizing the noted techniques, various embodiments of the present invention: (i) enhance the computational efficiency of software systems and hardware systems managing call center systems by reducing the number of costly call forwarding operations, and (ii) reduce the possibility of system breakdown of software systems and hardware systems managing call center systems by reducing the overall duration of calls processed by the noted systems.

Many contact centers may rely on agents to field and route calls within contact center systems. For examples, a caller with a query may speak with a number of agents during a particular call before a query is resolved. An important driver for optimizing contact center operations that directly impacts customer satisfaction is minimizing the number of agent transfers required to resolve a particular query. A call with multiple transfers incurs costly agent-to-agent handoffs and increases call resolution time, thereby degrading customer experience. In some examples, an initial agent may lack sufficient expertise in addressing the particular domain the query is related to. In some cases, an agent may not know which business unit in the organization is appropriate to answer the call, thereby resulting in one or more subsequent transfers. In such examples, it may be possible to leverage organizational knowledge from other agents that have the necessary expertise, as this knowledge may be encoded in recorded/historical audio calls that were successfully resolved.

Various embodiments of the present disclosure address many of these technical disadvantages. Additionally, the machine learning frameworks utilized herein provide technical advantages that allow for accurate processing of real-time audio streams to generate accurate predictive outputs including a call success prediction and/or forwarding recommendation prediction with respect to an audio data object describing a real-time audio stream. The techniques disclosed herein lead to performing one or more prediction-based actions so that a call can be analyzed in real-time and an appropriate action can be taken, thus avoiding system inefficiencies, higher costs, and/or lower effectiveness experienced due to multiple transfers and lack of agent expertise.

II. Definitions of Certain Terms

The term "audio data object" may refer to a data object that describes at least a portion of a real-time audio stream or a recorded call between two or more parties (e.g., a call between a caller (that may be associated with a predictive entity) and one or more agents). In some embodiments, the real-time audio stream may be associated with an interactive voice response (IVR) system, a contact center environment, and/or the like. The audio data object may comprise or otherwise be associated with an event sequence defining an ordered sequence of transfers associated with a real-time audio stream or recorded call. For example, the event sequence may define a sequence of transfers wherein each transfer is associated with a particular agent with whom a caller may interact and/or speak with during a call.

The term "predictive entity data object" may refer to a data object that describes an entity with respect to whom one or more predictive data analysis operations are performed. In some embodiments, a predictive entity may refer to a data object that describes a caller/patient. An example predictive entity may correspond with an identifier (e.g., patient identifier such as patient name, member ID and/or the like). A predictive entity may be associated with one or more attributes such as member demographic information/data (e.g., age, gender, and/or the like), claim information/data, historical audio data and/or the like.

The term "audio processing machine learning model" may refer to a data object that describes operations and/or parameters of a machine learning model that is configured to perform a plurality of operations with respect to an audio data object in order to generate at least one of an audio-based feature set, a transcription output data object, and a call success prediction measure. The audio processing machine learning model model may be configured to process a primary audio data object in order to generate a primary audio-based feature set and a primary transcription output data object associated with the primary audio data object. Additionally, the audio processing machine learning model may be configured to utilize as input one or more attributes associated with a predictive entity that is in turn associated with the audio data object. In some embodiments, the audio processing machine learning model may comprise a plurality of machine learning models, layers and/or components. For example, the audio processing machine learning model may comprise one or more Fast Fourier Transform (FFT) layer(s), processing layer(s) (e.g., Recurrent Neural Network (RNN) layers, long short-term memory (LSTM) layer(s), gated recurrent unit(s) (GRUs)), convolution layer(s), dense layer(s), concatenation layer(s), combinations thereof, and/or the like. In some embodiments, the audio processing machine learning model may be configured to process an audio data object in order to generate an audio-based feature set. The audio-based feature set may comprise one or more prosodic attributes associated with an audio data object such as volume, pitch, intensity, intonation, stress, rhythm, and/or the like. Additionally, the audio-based feature set may comprise one or more features associated with a predictive entity (e.g., contextual data/information). An example audio processing machine learning model may include one or more of a trained supervised machine learning model, a trained Word2Vec machine learning component, convolutional neural network model, a language-based model, an autoencoder model, a recurrent neural-network-based encoder model, a transcription sub-model, and/or the like. In some embodiments, the inputs to the audio processing machine learning model include a set of vectors or matrices each representing a time slice of a primary audio data object. In some embodiments, the outputs of the audio processing machine learning model include a vector describing a primary audio-based feature set, a string describing a primary transcription output data object, and/or a vector describing a call success likelihood measure.

The term "call success prediction measure" may refer to a data object describing an inferred likelihood of success of a call (e.g., as determined based at least in part on a particular audio data object for the call), where the inferred likelihood may be determined based at least in part on audio processing operations performed by an audio processing machine learning model. An example call success prediction measure may be a value (e.g., a percentage value or a number between 0 and 1), where an above-threshold value indicates that the call is likely to be successful. The call success prediction measure may be determined based at least in part on an audio-based feature set for a call, a transcription output data object for a call, and/or the like.

The term "processing layer" may refer to a data object that describes a layer or component of an audio processing machine learning model that is configured to perform one or more operations with respect to an input (e.g., a convolution output data object) in order to generate an output (e.g., an intermediary output of the audio processing machine learning model). One or more processing layers may operate to modify (e.g., flatten, combine) an input in order to generate the output. An example processing layer may comprise a GRU, RNN layer, LSTM layer, or the like.

The term "transcription sub-model" may refer to a data object that describes a layer or component of an audio processing machine learning model that is configured to perform one or more operations with respect to an input (e.g., an audio data object) in order to generate a transcription output data object. The example transcription sub-model may comprise an automatic speech recognition (ASR) engine/component (e.g., Google Cloud Speech, Amazon Transcribe or the like).

The term "FFT layer" may refer to a to a data object that describes a layer or component of an audio processing machine learning model that is configured to process and/or transform an audio data object and generate an FFT output data object. An example FFT output data object may describe one or more prosodic features associated with the audio data object. For example, in particular embodiments, the FFT layer may utilize a Fast Fourier Transform to convert one or more prosodic features, such as volume, pitch, intensity, intonation, stress, rhythm, and/or the like, from the time domain to the frequency domain. In some embodiments, the FFT layer may generate a spectrogram (e.g., visual representation) of the one or more prosodic features.

The term "convolution layer" may refer to may refer to a to a data object that describes layer or component of an audio processing machine learning model that is configured to perform one or more convolution operations with respect to an input (e.g., an FFT output data object) in order to generate a convolutional output data object. In particular embodiments, the convolution layer may create a convolution kernel that is convolved with the audio data object over a single spatial dimension (e.g., time) to produce the convolutional output data object. Accordingly, in some embodiments, the convolutional output data object may comprise a feature vector describing values for one or more prosodic features represented by an example FFT output data object.

The term "concatenation layer" may refer to a data object that describes a layer or component of an audio processing machine learning model that is configured to combine (e.g., merge, concatenate, stack and/or the like) two or more data objects to generate a concatenated output data object describing the data (e.g., features) in the two or more data objects. For example, the concatenation layer may be configured to process an audio-based feature set and predictive entity attributes in order to generate a concatenated output data object. Concatenation of the audio-based feature set and the predictive entity attributes may include vector-by-vector operations to extract new features from feature data objects associated therewith.

The term "dense layer" may refer to a data object that describes a layer or component of an audio processing machine learning model that is configured to perform one or more operations with respect to an input (e.g., a concatenation output data object) in order to generate a dense output data object. In some embodiments, the dense layer may comprise a supervised or unsupervised machine learning component (e.g., a neural network having one or more fully-connected layers). In some examples, the dense output data object may describe or comprise a call success prediction measure.

The term "event sequence" may refer to a data object that describes an ordered sequence of transfers and/or agents associated with an audio data object. The event sequence may be used as input to train a similarity determination machine learning model. In some embodiments, the event sequence may describe a sequence of agents with whom a caller interacts and/or speaks with during a call. Each agent may further be associated with a defined time period. By way of example, an example predictive entity may interact with three agents during a particular call that begins with a primary timestamp and terminates with a secondary timestamp. For instance, a caller may interact with and/or speak with a first agent for a first defined time period (e.g., beginning with the primary timestamp). Then, the caller may interact with and/or speak with a second agent for a second defined time period subsequent to the first defined time period (e.g., between the primary timestamp and the secondary time stamp). Additionally, the caller may interact with and/or speak with a third agent subsequent to the second defined time period (e.g., terminating with the secondary timestamp). Each event sequence may be associated with a plurality of event sequence characteristics such as a particular sequence of transfers and/or agents, a transfer count or call duration.

The term "audio-based feature set" may refer to an output of an audio processing machine learning model that is configured to process an audio data object. The audio-based feature set may comprise one or more prosodic attributes associated with an audio data object such as volume, pitch, intensity, intonation, stress, rhythm, and/or the like. In some embodiments, the audio-based feature set may comprise call attributes such as call type/purpose, IVR data/information, caller metadata (e.g., predictive entity attributes, historical audio data object(s), and/or the like).

The term "similarity determination machine learning model" may refer to a data object that describes operations and/or parameters of a machine learning model that is configured to generate a predictive output describing a predictive similarity measure between two or more data objects (e.g., a primary audio data object and a plurality of secondary audio data objects) based at least in part on embeddings of the audio data objects. For example, the similarity determination machine learning model may be configured to process a primary audio data embedding data object and a secondary audio data embedding data object in order to determine a predictive similarity measure between the primary audio data embedding data object and the secondary audio data embedding data object. The predictive similarity measure may be an inferred degree or measure of similarity between the two data audio data embedding objects. In some embodiments, the similarity determination machine learning model is configured to identify a similar subset of a plurality of audio data embedding data objects (e.g., secondary audio data embedding data objects) wherein each audio data embedding data object in the similar subset is deemed to have an above-threshold predictive similarity measure in relation to a primary audio data embedding data object. As such, the above-threshold predictive similarity measure may refer to a data object that describes a threshold which, when exceeded by two respective audio data embedding data objects, leads to an inference that the two audio data embedding data objects are similar. The operations of an example similarity determination machine learning model may comprise similarity determination operations such as cosine distance similarity measurement operations, Jaccard distance measurement operations, similarity determination operations that are performed using encodings that are generated using a Bidirectional Encoder Representation from Transformers (BERT) algorithm, similarity determination operations that are performed using encodings that are generated using a Siamese Manhattan LSTM algorithm, and/or the like. An example of a similarity determination machine learning model is a convolutional neural network model. In some embodiments, the inputs to of the similarity determination machine learning model include a set of vectors each describing an audio data embedding data object. In some embodiments, the outputs of the similarity determination machine learning model include a vector describing the predictive output.

The term "predictive similarity measure" may refer to a data object that describes an inferred measure of similarity between a first audio data embedding data object and a second audio data embedding data object (e.g., associated with a primary audio data object and a secondary audio data object, respectively), where the inferred measure is determined based at least in part on similarity determination operations performed by a similarity determination machine learning model. An example predictive similarity measure for two data objects may be a distance measure between respective encoded representations corresponding with each data object. An example predictive similarity measure may be a value between 0 and 1, in which a value close to 0 indicates that the first audio data object and a second audio data object are less similar, and in which a number close to 1 indicates that the first audio data object and the second audio data object are more similar.

The term "similar subset" may refer to a data object describing one or more candidate secondary audio data embedding data objects, each having a predictive similarity measure with respect to a primary audio data embedding data object that is deemed to satisfy an above-threshold predictive similarity measure in relation to the primary audio data embedding data object. In some embodiments, the predictive similarity measure threshold that is used to determine the similar subset is determined in a static or dynamic manner, e.g., is determined in a manner that the similar subset will comprise the top n secondary audio data embedding data objects having the top n predictive similarity measures with respect to the primary audio data embedding data object. The similar subset may be an output of a similarity determination machine learning model. In some embodiments, the similar subset may be utilized to determine a call success prediction measure with respect to an audio data object.

The term "audio embedding sub-model" may refer to a data object that describes operations and/or parameters of a machine learning model or a component of a machine learning model that is configured generate an embedding with respect to an audio data object. For example, the audio embedding sub-model may be configured to process an output of an audio processing machine learning model (e.g., an audio-based feature set and/or a transcription output data object) in order to generate an audio data embedding data object for an audio data object. An example of an audio embedding sub-model is a trained Word2Vec machine learning component or Global Vectors for Word Representation (GloVe) machine learning component. The output of the audio embedding sub-model may be further processed by a similarity determination machine learning model and one or more other machine learning components associated therewith in order to generate a final predictive output.

The term "audio data embedding data object" may refer to a data object that describes a numerical (e.g., vector) representation of an audio data object. In some embodiments, the audio data embedding data object may be an intermediary/predictive output of an audio embedding sub-model that is generated based at least in part on processing an audio-based feature set and/or a transcription output data object associated with the audio data object. The audio-based feature set and/or transcription output data object may be the output of an audio processing machine learning model. The audio data embedding data object may comprise a numerical representation in a multi-dimensional (e.g., an N-dimensional) embedding space corresponding with a particular audio data object. In some embodiments, the audio data object may describe a real-time audio stream (e.g., a primary audio data object) or a historical recorded call (e.g., secondary audio data object) between a caller and one or more agents.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing predictive data analysis steps/operations and generating corresponding user interface data (e.g., for providing and/or updating a user interface). The system architecture 100 includes a audio-based predictive computing system 101 comprising a audio-based predictive computing entity 106 configured to generate predictive outputs that lead to performing one or more prediction-based actions. The audio-based predictive computing entity 106 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 may include a storage subsystem 108 configured to store at least a portion of the data utilized by the audio-based predictive computing entity 106. The audio-based predictive computing entity 106 may be in communication with one or more external computing entities 102. The audio-based predictive computing entity 106 may be configured to receive requests and/or data from external computing entities 102, process the requests and/or data to generate predictive outputs (e.g., predictive similarity measure data objects) and provide the predictive outputs to the external computing entities 102. The external computing entity 102 (e.g., management computing entity) may periodically update/provide raw input data (e.g., audio data objects) to the audio-based predictive computing entity 106. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the audio-based predictive computing entity 106 to perform predictive data analysis steps/operations and tasks. The storage subsystem 108 may be configured to store at least a portion of operational data and/or operational configuration data including operational instructions and parameters utilized by the audio-based predictive computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of an audio-based predictive computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the audio-based predictive computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the audio-based predictive computing entity 106 may include or be in communication with a processing element 205 (also referred to as processors, processing circuitry, and/or similar terms used herein interchangeably) that communicate with other elements within the audio-based predictive computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), FPGAs, programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the audio-based predictive computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the audio-based predictive computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the audio-based predictive computing entity 106 with the assistance of the processing element 205 and operating system.

As indicated, in one embodiment, the audio-based predictive computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the audio-based predictive computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the audio-based predictive computing entity 106 may include or be in communication with one or more input elements, such as a keyboard input, a mouse input, a touch screen/display input, motion input, movement input, audio input, pointing device input, joystick input, keypad input, and/or the like. The audio-based predictive computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the audio-based predictive computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the audio-based predictive computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the audio-based predictive computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the audio-based predictive computing entity 106 and/or various other computing entities.

In another embodiment, the external computing entity 102 may include one or more components or functionality that are the same or similar to those of the audio-based predictive computing entity 106, as described in greater detail above. As will be recognized, these frameworks and descriptions are provided for exemplary purposes only and are not limiting to the various embodiments.

V. Exemplary System Operations

Described herein are various techniques for predictive data analysis steps/operations in relation to at least a a primary audio data object. Some of the disclosed techniques may utilize one or more machine learning models to perform predictive data analysis steps/operations that lead to performing one or more prediction-based actions. Some of the described techniques utilize a particular configuration of machine learning models, components, layers and/or the like. The output of a machine learning model, components, and/or layers therein may be supplied as an input for subsequent steps/operations by another machine learning model, component and/or layer.

FIG. 4 provides an operational example of an audio-based predictive computing entity 106. The audio-based predictive computing entity 106 is configured to perform a plurality of predictive steps/operations and tasks in order to generate one or more predictive outputs. The audio-based predictive computing entity 106 may comprise one or more units configured to perform predictive data analysis operations with respect to a primary audio data object 401 to generate a predictive output 415 that can be utilized to perform one or more prediction-based actions. The primary audio data object 401 may describe at least a portion of a real-time audio stream between two or more parties (e.g., between a caller and one or more agents). In some embodiments, the example primary audio data object 401 (e.g., real-time audio stream) may be associated with an IVR system and/or a contact center environment. An example primary audio data object 401 may comprise an event sequence defining an ordered sequence of transfers and/or agents associated with a call.

Referring now to FIG. 5 an operational example depicting an event sequence associated with a call is provided. In various embodiments, a caller 501 may participate in a call (e.g., with one or more agents at a contact center) that begins with a primary timestamp $t_1$ and terminates with a secondary timestamp $t_4$. As depicted in FIG. 5, a caller 501 may speak with/interact with a first agent 502, a second agent 504 and a third agent 506 during the call. As depicted, the caller 501 may speak with/interact with the first agent 502 for a first defined time period between $t_1$ and $t_2$. Subsequent to the interaction with the first agent 502, the call may be transferred to the second agent 504 and the caller 501 may speak with/interact with the second agent 504 for a second defined time period between $t_2$ and $t_3$. Subsequent to the interaction with the second agent 504, the call may be transferred to the third agent 506 and the caller 501 may speak with/interact with the third agent 506 for a third defined time period between $t_3$ and $t_4$, at which point the call terminates. Accordingly, the event sequence may be or comprise an ordered sequence of transfers and/or agents (e.g., a first agent 502, a second agent 504 and a third agent 506) that are associated with the call. The event sequence may further be associated with a plurality of event sequence characteristics that are indicative of a successful call, such as a particular sequence of transfers and/or agents, a transfer count, a call duration, combinations thereof, and/or the like. For example, a call duration below a threshold value (e.g., 15 minutes or less) may be indicative of a successful call. Additionally and/or alternatively, a transfer count below a threshold value (e.g., three transfers or less) may also be indicative of a successful call.

Returning now to FIG. 4, as depicted, the audio-based predictive computing entity 106 comprises an audio processing machine learning model 403 and a similarity determination machine learning model 409.

The audio processing machine learning model 403 may be a machine learning model that is configured to perform a plurality of operations with respect to the primary audio data object 401 in order to generate a primary audio-based feature set 405 and a primary transcription output data object 407, where the primary audio-based feature set 405 and the primary transcription output data object 407 can then be used by the audio processing machine learning model 403 to generate a call success prediction 421 for a call that is associated with the primary audio data object 401. As depicted in FIG. 4, the audio processing machine learning model 403 may be configured to process the primary audio data object 401 in order to generate a primary audio-based feature set 405 and/or a primary transcription output data object 407 associated with the primary audio data object 401. The audio processing machine learning model may comprise Fast Fourier Transform (FFT) layer(s), processing layer(s) (e.g., Recurrent Neural Network (RNN) layers, long short-term memory (LSTM) layer(s), gated recurrent unit(s) (GRUs)), convolution layer(s), dense layer(s), concatenation layer(s), transcription sub-model(s), combinations thereof, and/or the like. The primary audio-based feature set 405 may describe one or more prosodic attributes associated with an audio data object such as volume, pitch, intensity, intonation, stress, rhythm, and/or the like. Additionally, in some embodiments, the audio-based feature set 405 may comprise call attributes such as call type/purpose, IVR data/information, caller metadata describing predictive entity attributes (e.g., caller attributes, such as caller demographic attributes), historical audio data object(s), and/or the like.

As further depicted in FIG. 4, the audio processing machine learning model 403 further comprises a transcription sub-model 403-1 that is configured to generate the primary transcription output data object 407. The transcription sub-model 403-1 may be a layer or component of the audio processing machine learning model 403 that is configured to perform one or more operations with respect to a primary audio data object in order to generate a primary transcription output data object 407. The example transcription sub-model may comprise an ASR engine/component such as Google Cloud Speech, Amazon Transcribe or the like.

Referring now to FIG. 9, an example process 403A for generating a call success prediction measure (e.g., describing an inferred likelihood of a call's success) by an audio processing machine learning model 403 is provided.

Beginning at step/operation 902, the audio processing machine learning model 403 receives a primary audio data object which may be associated with a predictive entity. The primary audio data object may comprise at least a portion of a real-time audio stream. The primary audio data object may correspond with a predictive entity identifier (e.g., caller/patient name, member ID, caller demographic data, and/or the like).

Subsequent to step/operation 902, the method proceeds to step/operation 904. At step/operation 904, the audio processing machine learning model 403 identifies a primary transcription output data object for the primary audio data object. As noted above, the primary transcription output data object may be an output of a transcription sub-model (e.g., ASR engine/component).

Subsequent to step/operation 904, the method proceeds to step/operation 906. At step/operation 906, the audio processing machine learning model 403 identifies a primary audio-based feature set for the primary audio data object. In some embodiments, the primary audio-based feature set may be determined based at least in part on one or more prosodic attributes associated with the primary audio data object (e.g., volume, pitch, intensity, intonation, stress, rhythm, and/or the like) and one or more predictive entity attributes. The predictive entity attributes may include other call attributes (e.g., call type or purpose, IVR data/information), call metadata, historical audio data object(s), combinations thereof, and/or the like.

Subsequent to step/operation 906, the method proceeds to step/operation 908. At step/operation 908, the audio processing machine learning model 403 generates a call success prediction measure with respect to the primary audio data object (e.g., real-time audio stream). As noted above, in some examples, the call success prediction measure is determined based at least in part on the audio-based feature set. In other examples, the call success prediction measure may be generated based at least in part on operations of a similarity determination machine learning model, as discussed below. In some embodiments, the audio-based predictive computing entity 106 may trigger operations of the similarity determination machine learning model 409 in an instance in which the call success prediction measure is below a threshold value (e.g., in response to determining that the call is not likely to be successful).

Referring now to FIG. 6, an operational example depicting an exemplary configuration of an exemplary audio processing machine learning model 603 within the architecture of an exemplary audio-based predictive computing entity 600 is provided. As depicted in FIG. 6, a caller 601 may initiate a call which is routed to an agent 605 with whom the caller speaks/interacts with. As illustrated, the example audio-based predictive computing entity 600 may monitor a call/real-time audio stream 602 between a caller 601 and one or more agents 605 via a system gateway component 607. Additionally, the system gateway component 607 may request/receive caller metadata associated with the caller 601. Additionally, as illustrated, the example audio-based predictive computing entity 600 comprises an audio processing machine learning model 603 that is configured to generate a call success prediction measure with respect to the call/real-time audio stream 602 and a similarity determination machine learning model 609 that is configured to generate a forwarding recommendation prediction and/or additional predictive outputs with respect to the call/real-time audio stream 602. The one or more predictive outputs that are generated by the similarity determination machine learning model 609 may be utilized to generate user interface data which is provided to the agent 605 that the caller is interacting with via the system gateway component 607 (e.g., via one or more displayed prompts).

Referring now to FIG. 7, an operational example of an audio processing machine learning model 403 is provided. As depicted, the example audio processing machine learning model 403 comprises an FFT layer 705, a convolution layer 707, a first processing layer 709, a transcription sub-model 711, a second processing layer 713, a concatenation layer 715, and a dense layer 717. In various embodiments, as depicted, the audio processing machine learning model is configured to process at least a primary audio data object 701 in order to generate a call success prediction measure 719 with respect to the primary audio data object 701.

As depicted in FIG. 7, the audio processing machine learning model 403 comprises an FFT layer 705. The FFT layer 705 is configured to process and/or transform the primary audio data object 701 (e.g., by utilizing a Fast Fourier Transform operation) and generate an FFT output data object describing one or more prosodic features associated with the primary audio data object. For example, the FFT layer may convert one or more prosodic features associated with the primary audio data object, such as volume, pitch, intensity, intonation, stress, rhythm, and/or the like, from the time domain to the frequency domain. In some embodiments, the FFT layer may generate a spectrogram (e.g., a visual representation) of the one or more prosodic features.

As noted above, the audio processing machine learning model 403 comprises a convolution layer 707. The convolution layer 707 is configured to perform one or more convolution operations with respect to the FFT output data object generated by the FFT layer 705 in order to generate a convolutional output data object. The convolution layer 707 may create a convolution kernel that is convolved with the audio data object over a single spatial dimension (e.g., time) to produce the convolutional output data object. The convolutional output data object may comprise a feature vector describing values for one or more prosodic features represented by the FFT output data object.

As further depicted FIG. 7, the audio processing machine learning model 403 comprises a first processing layer 709. The first processing layer 709 is configured to perform one or more operations with respect to the convolution output data object generated by the convolution layer 707 in order to generate an intermediary output. For example, the first processing layer 709 may modify (e.g., flatten, combine, or the like) the convolution output data object to generate the intermediary output. The example first processing layer 709 may comprise a GRU, RNN layer, LSTM layer, combinations thereof, and/or the like.

As noted above, the audio processing machine learning model 403 comprises a transcription sub-model 711 (e.g., an ASR engine/component) that is configured to process the primary audio data object 701 and generate a primary transcription output data object. Additionally, as depicted, the audio processing machine learning model 403 comprises a second processing layer 713 that is configured to perform one or more operations with respect to the primary transcription output data object. In some examples, the audio processing machine learning model 403 may not comprise a transcription sub-model 711 and may be configured to directly process audio data objects (e.g., real-time audio streams).

As further depicted in FIG. 7, the audio processing machine learning model 403 comprises a concatenation layer 715. The concatenation layer 715 is configured to combine (e.g., merge, concatenate, stack and/or the like) the output of the second processing layer 713 and a predictive entity data object 703 to generate a concatenated output data object describing features of both data objects data (e.g., features) in the two or more data objects. The predictive entity data object 703 may be a data object that describes a predictive entity with respect to whom one or more predictive data analysis operations are performed (e.g., a caller and/or patient). The predictive entity may correspond with an identifier (e.g., patient identifier such as patient name, member ID and/or the like). The predictive entity may be associated with one or more attributes such as member demographic information/data (e.g., age, gender, and/or the like) claim information/data, historical audio data, caller metadata, and/or the like. In some embodiments, the concatenation layer 715 may perform vector-by-vector operations to extract new features from the output of the second processing layer 713 and the predictive entity data object 703 in order to generate an audio-based feature set.

As noted above, the audio processing machine learning model 403 comprises a dense layer 717. The dense layer 717 is configured to perform one or more operations with respect to the concatenation output data object in order to generate a dense output data object. The dense layer 717 may comprise a supervised or unsupervised machine learning component (e.g., a neural network having one or more fully-connected layers). In some examples, as depicted the dense output data object may describe or comprise a call success prediction measure 719 based at least in part on the primary audio data object 701 and the predictive entity data object 703.

Returning now to FIG. 4, as noted above, the audio-based predictive computing entity 106 comprises a similarity determination machine learning model 409. As depicted, the similarity determination machine learning model 409 is configured to process the primary audio-based feature set 405 and/or the primary transcription output data object 407 in order to generate one or more predictive outputs 415 that can be used to perform one or more prediction-based actions. Similarity determination operations may include operations such as cosine distance similarity measurement operations, Jaccard distance measurement operations, similarity determination operations that are performed using encodings that are generated using a Bidirectional Encoder Representation from Transformers (BERT) algorithm, similarity determination operations that are performed using encodings that are generated using a Siamese Manhattan LSTM algorithm, and/or the like.

As depicted in FIG. 4, the similarity determination machine learning model 409 comprises an audio embedding sub-model 409-1 that is configured to process a primary transcription output data object 407 in order to generate a primary audio data embedding data object 413 for the primary audio data object 401. The audio embedding submodel may be a trained Word2Vec machine learning component or GloVe machine learning component. An audio data embedding data object (e.g., primary audio data embedding data object or secondary audio data embedding data object) may be a numerical (e.g., vector) representation corresponding with an audio data object, where the numerical representation includes a value corresponding with each dimension of a multi-dimensional (e.g., an N-dimensional) embedding space. In various embodiments, the similarity determination machine learning model 409 is configured to generate a predictive output 415 describing a predictive similarity measure (e.g., inferred measure of similarity) between the primary audio data embedding data object 413 and a plurality of secondary audio data embedding data objects 411 (that may be generated, for example, by processing secondary audio-based feature sets and secondary transcription data objects for a the a plurality of secondary audio data embedding data objects 411 using the audio embedding sub-model 409-1). For example, the similarity determination machine learning model may be configured to process the primary audio data embedding data object 413 and a plurality of secondary audio data embedding data objects 411 in order to determine a predictive similarity measure between the primary audio data embedding data object 413 and each of the candidate secondary audio data embedding data objects 411. As such, the similarity determination machine learning model 409 may generate a plurality of predictive similarity measures between a primary audio data embedding data object 413 and each of a respective plurality of secondary audio data embedding data objects 411 in order to identify a similar subset of the plurality of secondary audio data embedding data objects. For example, each secondary audio data embedding data object 411 in the similar subset may be deemed to have a threshold-satisfying (e.g., above-threshold) predictive similarity measure in relation to the primary audio data embedding data object. As such, a predictive similarity measure threshold may refer to a data object that describes a threshold value which, when satisfied (e.g., exceeded) by the predictive similarity measure for two respective audio data embedding data objects, leads to an inference that the two audio data embedding data objects are similar and thus each audio data embedding data object of the two audio data embedding data objects is in the similar subset for the other audio data embedding data object of the two audio data embedding data objects. Additionally and/or alternatively, in some embodiments, the audio-based predictive computing entity 106 may generate a forwarding recommendation prediction, e.g., based at least in part on the output of the similarity determination machine learning model 409. In some embodiments, the similar subset may be utilized to generate a call success prediction measure with respect to an audio data object.

Referring now to FIG. 10, an example process 409A for generating a forwarding recommendation prediction by a similarity determination machine learning model 409 is provided. The forwarding recommendation prediction may describe a recommended agent or agent group for a call so that the call may lead to a successful call outcome.

Beginning at step/operation 1002, the similarity determination machine learning model 409 generates a primary audio data embedding data object for a primary audio data object. In some embodiments, the similarity determination machine learning model may receive or generate a primary transcription output data object and/or primary audio-based feature set for a primary audio data object describing at least a portion of a real-time audio stream. The similarity determination machine learning model 409 may then generate the primary audio data embedding data object based at least in part on the primary transcription output data object and/or the primary audio-based feature set. The primary audio data object may be associated with a particular caller and/or a particular predictive entity (e.g., caller/patient name, member ID and/or the like).

Subsequent to step/operation 1002, the method proceeds to step/operation 1004. At step/operation 1004, the similarity determination machine learning model 409 processes the primary audio data embedding data object and a plurality of secondary audio data embedding data objects to identify a similar subset of the plurality of secondary audio data embedding data objects. In some examples, the plurality of secondary audio data embedding data objects may each be associated with a historical recorded call that is associated with a successful call outcome. In some examples, a proxy metric (e.g., a post-call survey) may be utilized to identify secondary audio data embedding data objects (e.g., historical calls) that are associated with a successful call outcome. In various examples, the plurality of secondary audio data embedding data objects may be used to train the audio-processing machine learning model and/or the similarity determination machine learning model.

In various embodiments, as discussed herein, the primary audio data object/primary audio data embedding data object is associated with an event sequence, a primary audio-based feature set and a primary transcription output data object. Similarly, each of the plurality of secondary audio data embedding data objects may each be associated with an event sequence, a secondary audio-based feature set and a secondary transcription output data object. The similar subset of the plurality of secondary audio data embedding data objects may be a subset of the plurality of audio data embedding data objects that are deemed most similar to the primary audio data embedding data object. For example, each secondary audio data embedding data object may have a predictive similarity measure with respect to the primary audio data embedding data object that is deemed to satisfy a threshold predictive similarity measure in relation to a primary audio data embedding object. By way of example, a threshold predictive similarity measure may be 0.8. Accordingly, if the predictive similarity measure between a primary audio embedding data object and a respective secondary audio data embedding data object is 0.9, then because the predictive similarity between the primary audio embedding data object and the respective secondary audio data embedding data object satisfies the threshold predictive similarity measure, that the primary audio embedding data object and the respective secondary audio data embedding data object are deemed to be similar. It should be understood that an above-threshold predictive similarity measure between two audio data embedding data objects may indicate that each respective event sequence, audio-based feature set, and/or transcription output data object associated therewith are also deemed to be similar to one another.

Subsequent to step/operation 1004, the method proceeds to step/operation 1006. At step/operation 1006, the similarity determination machine learning model 409 generates a forwarding recommendation prediction with respect to the primary audio data embedding data object. In various examples, the forwarding recommendation prediction is based at least in part on one or more characteristics of the similar subset of the plurality of secondary audio data embedding data objects. By way of example, if the similar subset of the plurality of secondary audio data embedding data objects is associated with a particular transfer sequence, agent(s) and/or agent groups that resulted in a successful call outcome, then the forwarding recommendation prediction may describe the same/similar transfer sequence, agent(s) and/or agent groups.

Referring now to FIG. 8, an operational example of a similarity determination machine learning model 409 is provided. The similarity determination machine learning model 409 is configured to generate one or more predictive outputs 815 with respect to a primary audio data object 801 describing a real-time audio stream. As depicted, the similarity determination machine learning model 409 comprises a transcription sub-model 803 and an audio embedding sub-model 809. As noted above in connection with FIG. 4, the audio-based predictive computing entity 106 is configured to process a primary audio data object 801. In some embodiments, the similarity determination machine learning model 409 comprises a transcription sub-model 803 (e.g., ASR engine/component) that is configured to process the primary audio data object 801 in order to generate a primary transcription output data object 805. In other embodiments, the audio processing machine learning model 403 processes the primary audio data object 801 to generate the primary transcription output data object 805 and provides the primary transcription output data object 805 to the similarity determination machine learning model 409.

As noted above, and as depicted in FIG. 8, the similarity determination machine learning model 409 comprises an audio embedding sub-model 809 that configured to perform one or more operations with respect to a primary transcription output data object 805 in order to generate a primary audio data embedding data object 810.

As further depicted in FIG. 8, the similarity determination machine learning model 409 performs one or more similarity determination operations 811 with respect to the primary audio data embedding data object and a plurality of secondary audio data embedding data objects 807 in order to identify a similar subset 813 of the plurality of secondary audio data embedding data objects 807 (e.g., top "N" most similar).

As depicted in FIG. 8, the similarity determination machine learning model 409 generates one or more predictive outputs 815 based at least in part on the similar subset 813 of the plurality of secondary audio data embedding data objects 807. In some embodiments, an example predictive output 815 may be or comprise a data object describing the similar subset 813 of the plurality of secondary audio data embedding data objects 807 and/or a forwarding recommendation prediction associated with the primary audio data object 801. By way of example, the one or more predictive outputs 815 may describe a particular agent or agent group, where transferring a call to the particular agent or agent group is likely to lead to a successful call outcome.

As noted above, the operations of the similarity determination machine learning model 409 may lead to performing one or more prediction-based actions based at least in part on the similar subset 813 of the plurality of secondary audio data embedding data objects 807 and/or the forwarding recommendation prediction. For example, the operations of the similarity determination machine learning model 409 may be performed in response to queries or triggers generated (e.g., by an external computing entity 102) based at least in part on user interaction with user interface data (e.g., messages, prompts, data objects and/or the like) for user interfaces that are configured to display/describe predictive outputs 815. An external computing entity 102 may provide user interfaces describing the predictive outputs 815 for presentation by a display device of the external computing entity 102. The user interface data may correspond with an associated workflow (e.g., agent contact center interface) for presentation to an end user (e.g., a contact center agent). For example, an external computing entity 102 may generate user interface data prompting an end user to forward the ongoing call to a particular agent group and/or provide additional insight/data regarding the caller (e.g., the caller's intentions).

Accordingly, the audio-based predictive computing entity 106 may provide (e.g., transmit, send) the one or more API-based data objects representing at least a portion of the predictive outputs 815 to an end user interface (e.g., a contact center agent interface) for display and/or further steps/operations. The predictive outputs 815 may be used to dynamically update the user interface operated by an end user (e.g., a contact center agent) or generate user interface data in response to queries. In some embodiments, the audio-based predictive computing entity 106 may account for agent availability and other parameters in determining a forwarding recommendation prediction. For example, the audio-based predictive computing entity 106 may determine that a particular agent is not at the contact center and recommend an alternative agent. In another example, the audio-based predictive computing entity 106 may determine that a particular agent group is currently unavailable and provide a prompt for the agent to instruct the caller to call again at a different time when the agent group will be available.

FIG. 11 provides an operational example showing a prediction output user interface 1100 (e.g., contact center agent interface) that may be generated based at least in part on user interface data describing the above-described predictive outputs. The external computing entity 102 may generate prediction output user interface 1100 based at least in part on received user interface data and present (e.g., transmit, send and/or the like) the prediction output user interface 1100 to an end user of the external computing entity 106. The user interface data may be used for dynamically updating the prediction output user interface 1100. In some embodiments, the prediction output user interface 1100 may dynamically update the display on a continuous or regular basis or in response to certain triggers.

As depicted in FIG. 11, the user interface data may describe a caller associated with a real-time audio stream. In some examples, as shown, the caller may further be associated with a patient profile such as a data object storing and/or providing access to patient information/data. The patient record/profile may also comprise member information/data, patient features, and/or similar words used herein interchangeably that can be associated with a given member, claim, and/or the like. As depicted, the prediction output user interface 1100 is configured to provide predictive outputs describing a forwarding recommendation prediction. As further depicted, the prediction output user interface 1100 may also provide information/data regarding the current call, and in some examples, historical call information associated with the caller.

The prediction output user interface 1100 may comprise various features and functionalities for accessing, and/or viewing user interface data. The prediction output user interface 1100 may also comprise messages to an end-user in the form of banners, headers, notifications, prompts, and/or the like. As will be recognized, the described elements are provided for illustrative purposes and are not to be construed as limiting the dynamically updatable interface in any way.

Using the above-described techniques, various embodiments of the present disclosure provide techniques for performing predictive data analysis steps/operations that are configured to generate a forwarding recommendation prediction for a primary audio data object (e.g., describing at least a portion of a real-time audio stream. These techniques are in turn configured to improve the efficiency of performing the noted predictive data analysis steps/operations and reliability of the generated results. There is a need for improved systems and methods that are configured to generate accurate predictive outputs so that one or more prediction-based actions can be initiated/taken in real-time. Various embodiments of the present invention address that need by disclosing techniques for utilizing audio processing machine learning models and similarity determination machine learning models in order to identify a similar subset of a plurality of predictive entities that satisfies an above-threshold predictive similarity measure with respect to the primary audio data embedding data object associated with the primary audio data object. The inventors have confirmed, via experiments and theoretical calculations, that various embodiments of the disclosed techniques improve efficiency and accuracy of predictive data analysis systems and predictive data analysis relative to various state-of-the-art solutions.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a predictive output with respect to a primary audio data embedding data object associated with a primary audio data object, the computer-implemented method comprising:
   generating, by one or more processors, by utilizing a similarity determination machine learning model, and based at least in part on the primary audio data embedding data object, the predictive output for the primary audio data embedding data object, wherein:
   (i) the primary audio data object is associated with an event sequence,
   (ii) an audio processing machine learning model is configured to process the primary audio data object to generate a primary audio-based feature set and a primary transcription output data object for the primary audio data object,
   (iii) the similarity determination machine learning model comprises an audio embedding sub-model configured to process the primary audio-based feature set and the primary transcription output data object to generate a primary audio data embedding data object for the primary audio data object,
   (iv) the similarity determination machine learning model is configured to process the primary audio data embedding data object and a plurality of secondary audio data embedding data objects to identify a similar subset from the plurality of secondary audio data embedding data objects that each satisfy an above-threshold predictive similarity measure in relation to the primary audio data embedding data object, and
   (v) the predictive output is determined based at least in part on the similar subset of the plurality of secondary audio data embedding data objects;
   generating, by the one or more processors, a forwarding recommendation prediction based at least in part on the predictive output; and
   performing, by the one or more processors, one or more prediction-based actions based at least in part on the forwarding recommendation prediction.

2. The computer-implemented method of claim 1, wherein the audio processing machine learning model is further configured to generate a call success prediction measure for the primary audio data object based at least in part on the primary audio-based feature set.

3. The computer-implemented method of claim 2, wherein the primary audio-based feature set is determined based at least in part on one or more predictive entity attributes associated with the primary audio data object.

4. The computer-implemented method of claim 1, wherein the one or more prediction-based actions are performed based at least in part on one or more event sequence characteristics of the similar subset of the plurality of secondary audio data embedding data objects.

5. The computer-implemented method of claim 4, wherein the one or more event sequence characteristics comprises one or more of a sequence of transfers and a transfer count threshold associated with each similar subset of the plurality of secondary audio data embedding data objects.

6. The computer-implemented method of claim 1, wherein the audio processing machine learning model comprises one or more of a trained Word2Vec component, a Global Vectors for Word Representation (GloVe) machine learning component, and a transcription sub-model.

7. The computer-implemented method of claim 1, wherein the one or more prediction-based actions comprises identifying one or more agents associated with each event sequence that is associated with the similar subset of the plurality of secondary audio data embedding data objects.

8. An apparatus for generating a predictive output with respect to a primary audio data embedding data object associated with a primary audio data object, the apparatus comprising one or more processors and at least one memory including program code, the at least one memory and the program code configured to, with the one or more processors, cause the apparatus to at least:
   generate by utilizing a similarity determination machine learning model and based at least in part on the primary audio data embedding data object, the predictive output for the primary audio data embedding data object, wherein:
   (i) the primary audio data object is associated with an event sequence,
   (ii) an audio processing machine learning model is configured to process the primary audio data object to generate a primary audio-based feature set and a primary transcription output data object for the primary audio data object,
   (iii) the similarity determination machine learning model comprises an audio embedding sub-model configured to process the primary audio-based feature set and the primary transcription output data object to generate a primary audio data embedding data object for the primary audio data object, (iv) the similarity determination machine learning model is configured to process the primary audio data embedding data object and a plurality of secondary audio data embedding data objects to identify a similar subset from the plurality of secondary audio data embedding data objects that each satisfy an above-threshold predictive similarity measure in relation to the primary audio data embedding data object, and (v) the predictive output is determined based at least in part on the similar subset of the plurality of secondary audio data embedding data objects;

generate a forwarding recommendation prediction based at least in part on the predictive output; and perform one or more prediction-based actions based at least in part on the forwarding recommendation prediction.

9. The apparatus of claim 8, wherein the audio processing machine learning model is further configured to generate a call success prediction measure for the primary audio data object based at least in part on the primary audio-based feature set.

10. The apparatus of claim 9, wherein the primary audio-based feature set is determined based at least in part on one or more predictive entity attributes associated with the primary audio data object.

11. The apparatus of claim 8, wherein the one or more prediction-based actions are performed based at least in part on one or more event sequence characteristics of the similar subset of the plurality of secondary audio data embedding data objects.

12. The apparatus of claim 11, wherein the one or more event sequence characteristics comprises one or more of a sequence of transfers and a transfer count threshold associated with each similar subset of the plurality of secondary audio data embedding data objects.

13. The apparatus of claim 8, wherein the audio processing machine learning model comprises one or more of a trained Word2Vec component, a Global Vectors for Word Representation (GloVe) machine learning component, and a transcription sub-model.

14. The apparatus of claim 8, wherein the one or more prediction-based actions comprises identifying one or more agents associated with each event sequence that is associated with the similar subset of the plurality of secondary audio data embedding data objects.

15. A computer program product for generating a predictive output with respect to a primary audio data embedding data object associated with a primary audio data object, the computer program product comprising at least one non-transitory computer-readable storage medium having computer-readable program code portions stored therein, the computer-readable program code portions configured to:

generate by utilizing a similarity determination machine learning model and based at least in part on the primary audio data embedding data object, the predictive output for the primary audio data embedding data object, wherein:

(i) the primary audio data object is associated with an event sequence, (ii) an audio processing machine learning model is configured to process the primary audio data object to generate a primary audio-based feature set and a primary transcription output data object for the primary audio data object, (iii) the similarity determination machine learning model comprises an audio embedding sub-model configured to process the primary audio-based feature set and the primary transcription output data object to generate a primary audio data embedding data object for the primary audio data object, (iv) the similarity determination machine learning model is configured to process the primary audio data embedding data object and a plurality of secondary audio data embedding data objects to identify a similar subset from the plurality of secondary audio data embedding data objects that each satisfy an above-threshold predictive similarity measure in relation to the primary audio data embedding data object, and (v) the predictive output is determined based at least in part on the similar subset of the plurality of secondary audio data embedding data objects;

generate a forwarding recommendation prediction based at least in part on the predictive output; and perform one or more prediction-based actions based at least in part on the forwarding recommendation prediction.

16. The computer program product of claim 15, wherein the audio processing machine learning model is further configured to generate a call success prediction measure for the primary audio data object based at least in part on the primary audio-based feature set.

17. The computer program product of claim 16, wherein the primary audio-based feature set is determined based at least in part on one or more predictive entity attributes associated with the primary audio data object.

18. The computer program product of claim 15, wherein the one or more prediction-based actions are performed based at least in part on one or more event sequence characteristics of the similar subset of the plurality of secondary audio data embedding data objects.

19. The computer program product of claim 18, wherein the one or more event sequence characteristics comprises one or more of a sequence of transfers and a transfer count threshold associated with each similar subset of the plurality of secondary audio data embedding data objects.

20. The computer program product of claim 15, wherein the audio processing machine learning model comprises one or more of a trained Word2Vec component, a Global Vectors for Word Representation (GloVe) machine learning component, and a transcription sub-model.

\* \* \* \* \*